US006924628B2

(12) United States Patent
Thompson

(10) Patent No.: US 6,924,628 B2
(45) Date of Patent: Aug. 2, 2005

(54) METHOD AND SYSTEM FOR OPERATING A GENERATOR USING A DYNAMIC CAPABILITY CURVE

(75) Inventor: Edward David Thompson, Casselberry, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 132 days.

(21) Appl. No.: 10/373,611

(22) Filed: Feb. 24, 2003

(65) Prior Publication Data

US 2004/0164717 A1 Aug. 26, 2004

(51) Int. Cl.[7] .............................. H02P 9/10; H02P 9/14; G01R 11/32
(52) U.S. Cl. ............................ 322/20; 322/21; 322/25; 324/142; 702/61
(58) Field of Search .............................. 322/20–21, 25; 702/61; 324/142

(56) References Cited

U.S. PATENT DOCUMENTS

| | | | |
|---|---|---|---|
| 4,766,557 A | 8/1988 | Twerdochlib | 702/51 |
| 5,009,833 A | 4/1991 | Takeuchi et al. | 376/217 |
| 5,264,778 A * | 11/1993 | Kimmel et al. | 322/25 |
| 5,485,491 A | 1/1996 | Salnick et al. | 376/245 |
| 5,581,470 A | 12/1996 | Pawloski | 702/61 |
| 6,088,659 A * | 7/2000 | Kelley et al. | 702/62 |
| 6,178,362 B1 * | 1/2001 | Woolard et al. | 700/295 |
| 6,204,642 B1 | 3/2001 | Lawson et al. | 322/20 |
| 6,294,898 B2 | 9/2001 | Lawson et al. | 322/20 |
| 6,466,858 B1 | 10/2002 | Adibhatla et al. | 701/100 |
| 6,492,801 B1 | 12/2002 | Sims et al. | 324/142 |
| 6,577,962 B1 * | 6/2003 | Afshari | 702/61 |
| 6,611,772 B1 * | 8/2003 | Lavoie et al. | 702/61 |
| 6,801,865 B2 * | 10/2004 | Gilgenbach et al. | 702/61 |
| 6,828,771 B1 * | 12/2004 | Ghassemi | 324/142 |

OTHER PUBLICATIONS

Generac Power Systems, Inc., *Power Manager*, 2 pages, Waukesha, WI, (www.generac.com/industrial/products/remoteMonitor.asp).

Ed Thompson, *Draft of Monticello GenAID upgrade proposal*, Txu Mo GenAID Upgrade, Feb. 12, 2002, 2 pages.

* cited by examiner

*Primary Examiner*—Darren Schuberg
*Assistant Examiner*—Pedro J. Cuevas

(57) ABSTRACT

Method and system are provided for operating a generator using a dynamic capability curve. In one embodiment, the method allows providing a family of static capability curves corresponding to nominal reference levels of pressure of a fluid for cooling the generator. The method further allows acquiring data indicative of the actual pressure of the cooling fluid. A dynamic capability curve is generated to be responsive to the actual pressure of the cooling fluid. The family of static capability curves may be displayed relative to the dynamic capability curve, thereby allowing the operator to monitor and control the operation of the generator based on the actual pressure of the cooling fluid and further in view of at least one of the nominal reference levels of pressure for the cooling fluid.

16 Claims, 3 Drawing Sheets

METHOD AND SYSTEM FOR OPERATING A GENERATOR USING A DYNAMIC CAPABILITY CURVE

FIELD OF THE INVENTION

The present invention relates in general to electrical generators, and, more particularly, to method and system for operating a generator using a dynamic capability curve.

BACKGROUND OF THE INVENTION

A generator is one key piece of equipment of a power generation plant and allows converting mechanical energy to electrical energy. An AC generator comprises two primary components: a rotor and a stator. The rotor is made up of electrically conductive coils that form a rotor winding. The stator is also made up of coils that form a stator winding. Mechanical energy turns the rotor relative to the stator while a field current is passed through the rotor winding to induce a voltage on the stator winding. The amount of power produced by the generator is typically limited by the design characteristics of the generator. For example, one needs to consider heating effects that may develop due to increased levels of currents passing through the stator or the rotor windings. To reduce these heating effects, a suitable cooling fluid, such as hydrogen gas, is commonly used in large generators. Increasing the gas pressure, and thus the flow of the cooling fluid, may increase the stator and field current capability limits.

Generator manufacturers normally specify the power capability limits of a generator in a machine-specific capability curve, such as that shown in FIG. 1. For hydrogen-cooled machines, a family of static capability curves at various nominal hydrogen pressures up to rated pressure may be provided. Plant operators use these types of curves to monitor the output of the generator in terms of reactive power (e.g., megavars) and real power (e.g., megawatts) to ensure that the generator is operated within its capability limits, thereby preventing potentially harmful overheating of the generator and/or costly plant shutdown.

Operators often operate hydrogen-cooled machines at pressures below the rated design conditions to, for example, eliminate unnecessary and costly gas leakage. Depending on how far below the rated hydrogen pressure the generator is operated, there may be significant underutilization of the power-generating capability of the generator.

BRIEF SUMMARY OF THE INVENTION

It has been recognized by the inventor of the present invention that a capability curve that dynamically varies in correspondence with the actual pressure of the cooling fluid is needed. This would allow the operator to accurately and consistently adjust at least one operational parameter of the generator to accurately match the present operational conditions of the generator. In view of the long-standing familiarity of the operators with the static capability curves, it would be desirable to display the dynamic capability curve jointly with the static curves. Moreover, in order to rapidly and accurately convey information to the operator regarding the operational performance of the generator, it would be also desirable to graphically and distinctively display the dynamic capability curve of the generator relative to the static curves.

Generally, the present invention fulfills the foregoing needs by providing in one aspect thereof, a method for operating a generator using a dynamic capability curve. The method allows providing a family of static capability curves corresponding to nominal reference levels of pressure of a fluid for cooling the generator. The method further allows acquiring data indicative of the actual pressure of the cooling fluid. A dynamic capability curve is generated to be responsive to the actual pressure of the cooling fluid. The family of static capability curves may be displayed relative to the dynamic capability curve, thereby allowing the operator to monitor and control the operation of the generator based on the actual pressure of the cooling fluid and further in view of at least one of the nominal reference levels of pressure for the cooling fluid.

In another aspect thereof, the present invention further fulfills the foregoing needs by providing a system for operating a generator using a dynamic capability curve. The system includes a data file configured to store a family of static capability curves corresponding to nominal reference levels of pressure of a fluid for cooling the generator. A device is used to acquire data indicative of the actual pressure of the cooling fluid. A processor is configured to generate a dynamic capability curve responsive to the actual pressure of the cooling fluid. The processor is further configured to access the data file for displaying the family of static capability curves relative to the dynamic capability curve, thereby allowing the operator to monitor and control the operation of the generator based on the actual pressure of the cooling fluid and further in view of at least one of the nominal reference levels of pressure for the cooling fluid.

In yet another aspect of the present invention, the present invention further fulfills the foregoing needs through the following actions: acquiring data indicative of the actual pressure of a fluid for cooling the generator; generating a dynamic capability curve responsive to the actual pressure of the cooling fluid; generating a graphical indication of the real and reactive power flow of the generator relative to the dynamic capability curve; and adjusting at least one operational parameter to affect the position of the graphical indication of real and reactive power relative to the dynamic capability curve.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

A capability curve is a curve that defines the boundaries of the area on a power flow diagram, such as real and reactive power flow diagram, within which a dynamoelectric machine, such as a generator, may be safely operated. The inventor of the present invention has innovatively recognized a way of integrating in a user-friendly manner techniques familiar to operators of the machines with techniques that allow one to more closely track the actual operational conditions of the machine so that the operator is able to rapidly and accurately asses this information without having to undergo any burdensome training, or without having to re-develop new instructional materials.

Figure 1:
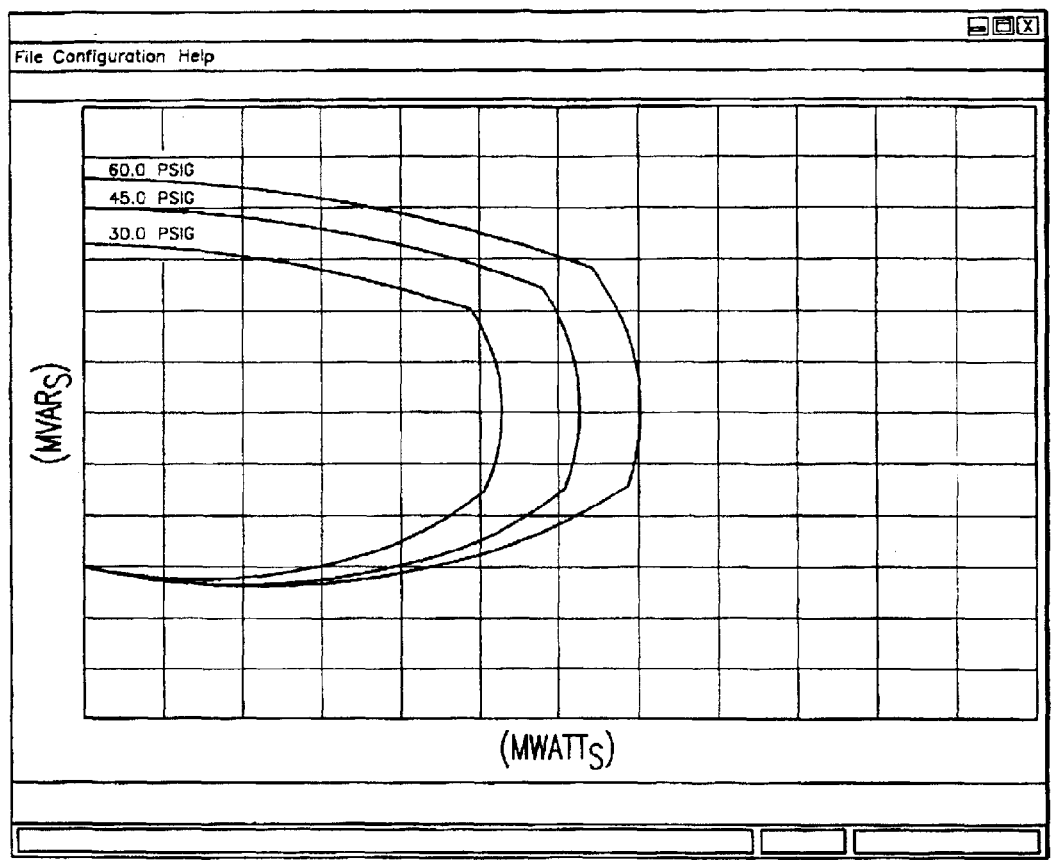
FIG. 1 illustrates an exemplary family of static capability curves of an electric generator at various nominal pressures of a cooling fluid.
Figure 2:
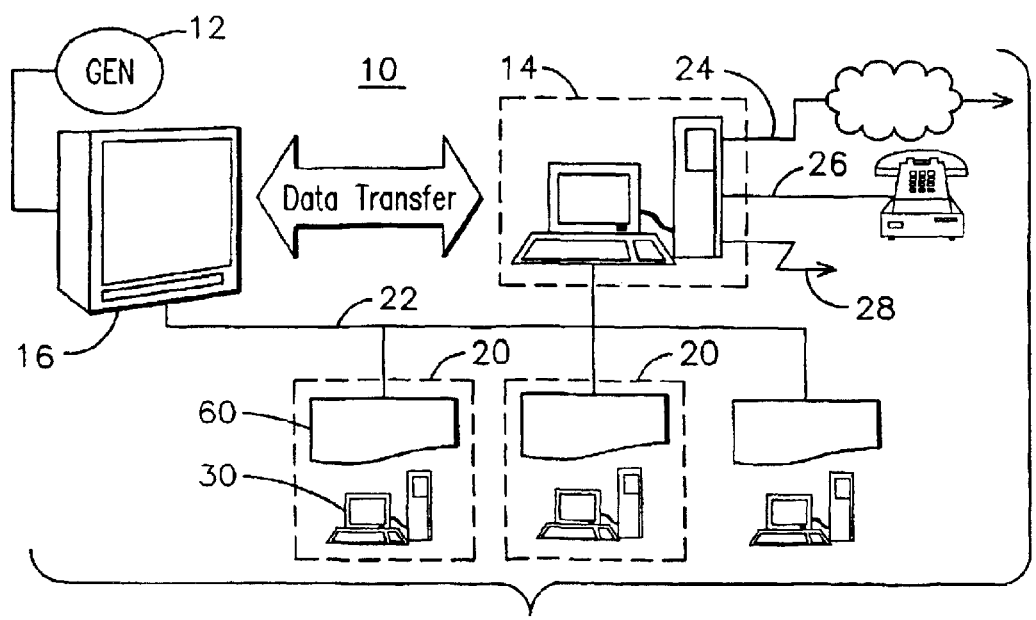
FIG. 2 illustrates an exemplary data communications system that may be used for communicating information to users regarding the performance of a generator.

FIG. 2 represents an exemplary data communications system 10 that may be used for communicating information to users, such as operators, service personnel, and engineering staff, regarding the operational performance of a generator 12. A server 14 may be connected to a plant computer system 16 to communicate and/or process data indicative of the performance of the generator. Server 14 may be connected to a plurality of computerized user stations 20 via a suitable communications network, such as a Local Area Network (LAN) 22, internet connection 24, modem connection 26, wireless connection 28, etc. In one exemplary embodiment, the user station may comprise a personal computer, laptop computer, or any other device able to communicate via a communications network.

Figure 3:
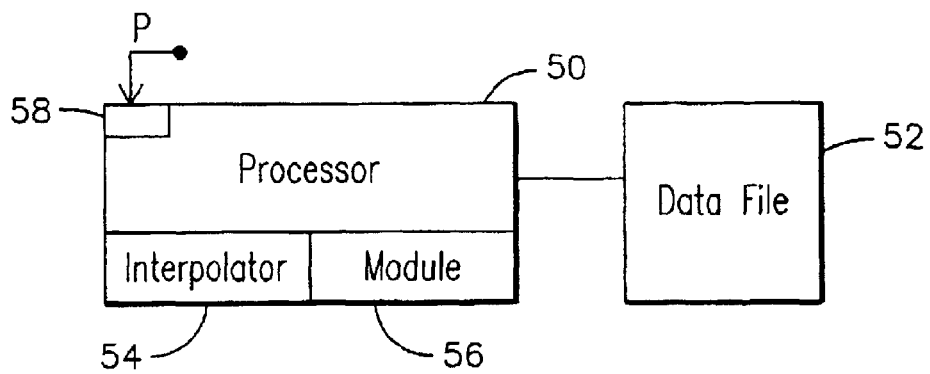
FIG. 3 illustrates an exemplary processor that may be used for processing a dynamic capability curve in accordance with aspects of the present invention.
Figure 4:
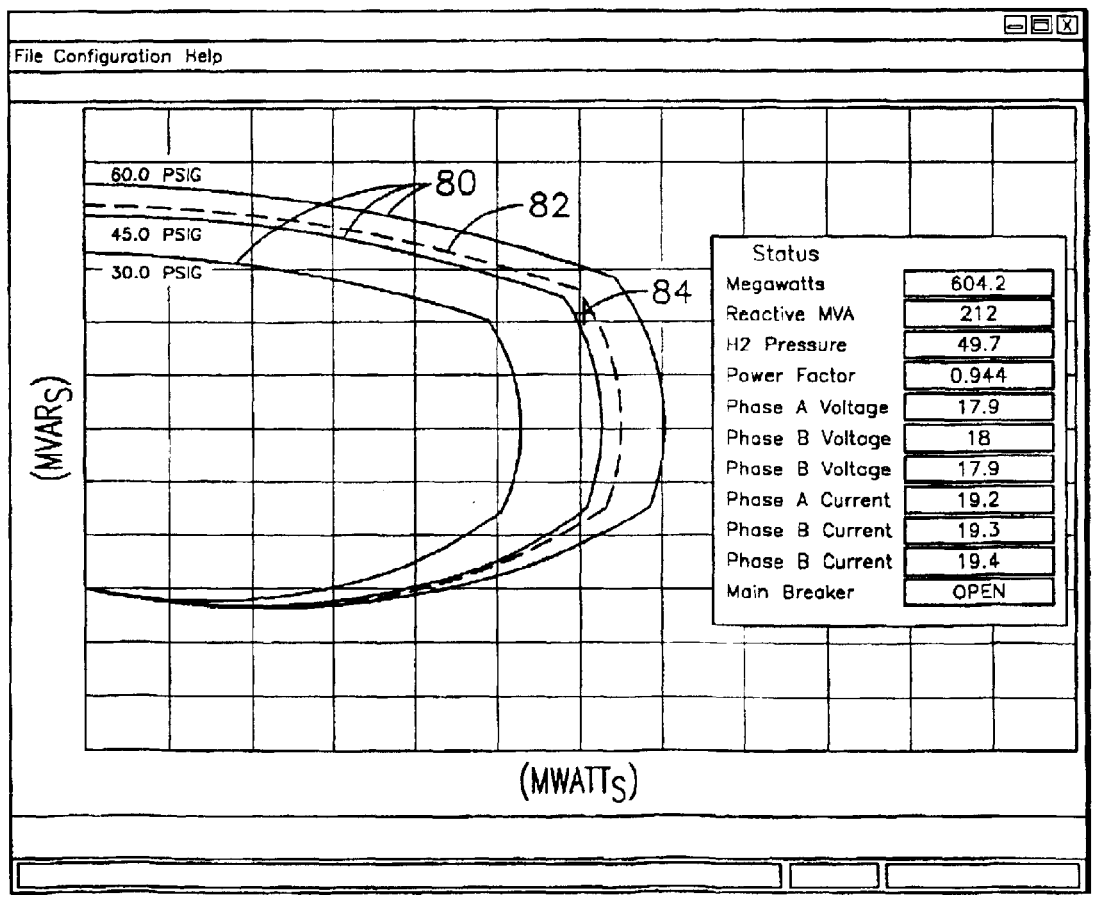
FIG. 4 illustrates an exemplary dynamic capability curve for a given generator processed to be graphically distinctive relative to the family of static capability curves for that generator.

In one aspect thereof, as illustrated in FIG. 3, server 14 comprises a processor 50 coupled to a data file 52 for storing a family of static capability curves 80, such as illustrated in FIG. 4, corresponding to nominal reference levels of pressure of a fluid (e.g., hydrogen) for cooling the generator. As used herein the expression data file may comprise a database, plain text file, text file with markup code (e.g., XML, HTML, SGML, etc.), binary files, etc. A module 58, such as a data acquisition module in processor 50, may be configured to acquire data indicative of the actual pressure (represented by the letter P) of the cooling fluid. In one exemplary embodiment, a pressure measurement of the cooling fluid is available from a standard pressure sensor that provides a signal indicative of the actual pressure of the cooling fluid. This pressure measurement may be communicated to the plant computer system and in turn to server 14. Processor 50 is further configured to generate a dynamic capability curve 82 (FIG. 4) based on the actual pressure of the cooling fluid. That is, the envelope or area defined by the dynamic capability curve would vary in response to the value of the actual pressure of the cooling fluid. In one exemplary embodiment the generation of the dynamic capability curve comprises interpolating in an interpolator 54 between respective curves of the family of capability of curves. In one exemplary embodiment, linear interpolation may be used for generating the dynamic capability curve. It will be appreciated, however, that the present invention is not limited to any specific type of interpolation since other interpolation techniques such as logarithmic or other type of interpolating scale may be used. In fact other computational techniques, such as may based on a functional relationship, may be used for generating the dynamic capability curve.

In one exemplary embodiment, the data file 52 may be accessed for displaying at a suitable display device 30 (FIG. 2) the family of static capability curves relative to the dynamic capability curve. A module 56 is configured to process the dynamic capability curve to be graphically distinctive relative to the displayed family of capability curves. For example, this may comprise generating a dotted curve, dashed curve, distinctly colored curve, flashing curve, bolded curve, distinctly shaded or colored region, such as may defined either inside or outside an invisible or visible line or boundary, and any combination of the foregoing.

Processor 50 is further configured to provide a graphical indication 84 (FIG. 4) of real and reactive power flow of the generator relative to the family of capability curves and to the dynamic capability curve. That is, the generator should be operated so that the graphical indication 84 is kept within the area bounded by dynamic capability curve 82. The family of static capability curves 80 allows the operator to readily determine whether the dynamic curve is approaching either an upper limit or a lower limit for the pressure of the cooling fluid. In the example of FIG. 4, the outermost capability curve would represent such an upper limit, while the innermost capability curve would represent such a lower limit.

In yet another aspect of the present invention, an adjuster 60 may be used for adjusting at least one operational parameter, such as a generator and/or plant operational parameter, to affect the position of the graphical indication of real and reactive power relative to the dynamic capability curve and at least one of the curves of the family of static capability curves. Adjuster 60 may be a user interface configured to accept a numerical value indicative of the adjustment to be made to the operational parameter. Examples of an operational parameter may be the pressure of the cooling fluid, or the values of the power flow produced by the generator. Thus, the adjuster may take the form of a valve for adjusting the amount of pressure of the cooling fluid. For example, if the graphical indication 84 is approaching the dynamic capability curve, the operator may decide to increase the pressure of the cooling fluid, presuming the numerical increase is below the upper limit for the pressure of the cooling fluid. Under an appropriate set of conditions, the operator could instead lower the power flow of the generator (or shift some of the load to another generator) so that graphical indication 84 remains within the dynamic capability curve, particularly if the dynamic capability curve is relative close to the outermost capability curve. That is, the generator is operating relatively close to the upper limit of the nominal pressure for the cooling fluid. It will be appreciated that a combination of the foregoing adjustments may be made by the operator to ensure the generator is operated within its rated capability.

It will be now appreciated that the operator can use the dynamic capability curve to assist him plan actions regarding generator operations. For instance, a plant dispatcher contacts the operator and asks for an increase in generator load to a certain level. The operator can use the dynamic capability curve to quickly determine if the present hydrogen pressure is sufficient to support that load, and make a decision as to whether to proactively increase gas pressure in advance of the load increase. Also, if adding gas is not preferable, the operator can use the dynamic capability curve to decide how much of a load increase he might shift to another generator at the plant. The operator can also better plan when to add hydrogen due to normal gas leakage from the generator.

The dynamic capability curve also allows the operator to be aware of the present operating state of the generator without confusion and time-consuming calculations. By comparing the graphical indication 84 of real and reactive power flow of the generator with the graphically distinctive dynamic capability curve, the operator knows exactly and essentially on real time basis where the present operational state of the generator stands without determining which static capability curve to use or without having to perform cumbersome calculations for interpolating relative to the actual pressure value of the cooling fluid. This will enhance the probability that the operator will quickly spot dynamically changing conditions, which if left uncorrected could become detrimental to the operation of the power plant. Examples of such changing conditions may be operational creeping of the generator over its power generating capacity if the load were to trend up or the hydrogen pressure were to decay over time due to normal leakage.

Figure 5:
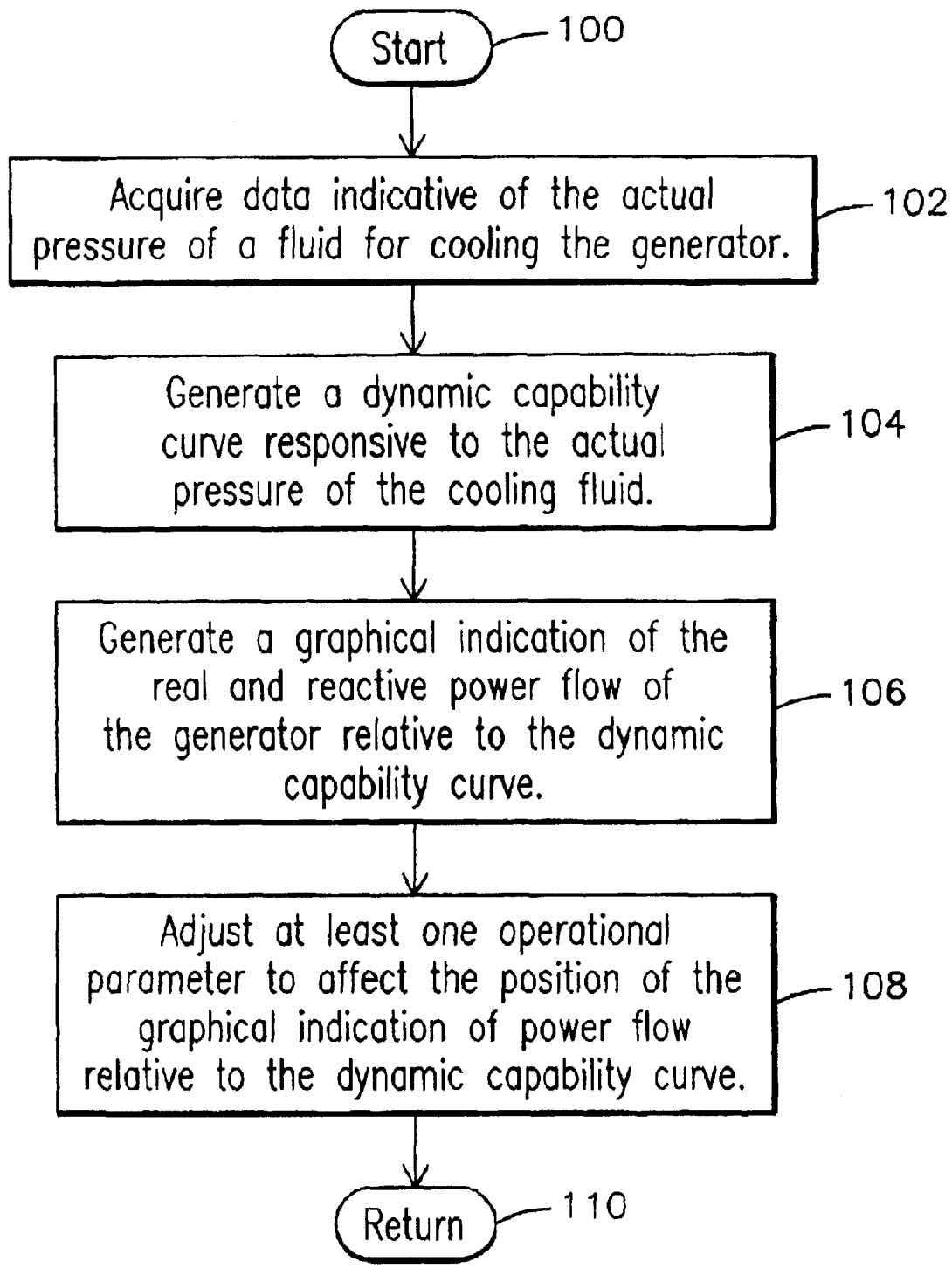
FIG. 5 is a flow chart of an exemplary method for operating a generator using a dynamic capability curve.

FIG. 5 is a flow chart of a method embodying aspects of the present invention for operating a generator using a dynamic capability curve. Subsequent to start block 100, block 102 allows acquiring data indicative of the actual pressure of a fluid for cooling the generator. Block 104 allows generating a dynamic capability curve responsive to the actual pressure of the cooling fluid. Block 106 allows generating a graphical indication of the real and reactive power flow of the generator relative to the dynamic capability curve. Prior to return block 110, block 108 allows adjusting at least one operational parameter to affect the position of the graphical indication of real and reactive power relative to the dynamic capability curve. In one exemplary embodiment, the operator may perform the adjustment of the operational parameter. It is contemplated, however, that such an adjustment may be automatically performed by an appropriately configured control system. One may optionally display relative to the dynamic capability curve a family of static capability curves corresponding to nominal reference levels of pressure of the cooling fluid. In this case, the dynamic capability curve would be processed to be graphically distinctive relative to the displayed family of capability curves.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. A method for operating a generator using a dynamic capability curve, the method comprising:
   providing a family of static capability curves corresponding to nominal reference levels of pressure of a fluid for cooling the generator;
   acquiring data indicative of the actual pressure of the cooling fluid;
   generating a dynamic capability curve responsive to the actual pressure of the cooling fluid; and
   displaying the family of static capability curves relative to the dynamic capability curve, said static capability curves and said dynamic capability curve comprising data displayable over a first area indicative of a power generation mode of the generator and a second area indicative of a power absorption mode of the generator, thereby allowing the operator to monitor and control the operation of the generator regardless of whether said generator is in the power generation mode or in the power absorption mode, based on the actual pressure of the cooling fluid and further in view of at least one of the nominal reference levels of pressure for the cooling fluid.

2. The control method of claim 1 further comprising generating a graphical indication of real and reactive power flow of the generator relative to the family of capability curves and to the dynamic capability curve.

3. The control method of claim 1 further comprising adjusting at least one operational parameter to affect the position of the graphical indication of real and reactive power relative to the dynamic capability curve and at least one of the curves of the family of static capability curves.

4. The control method of claim 1 further comprising processing the dynamic capability curve to be graphically distinctive relative to the displayed family of capability curves.

5. The control method of claim 4 wherein the processing of the dynamic capability curve to be graphically distinctive relative to the displayed family of capability curves is selected from the group consisting of generating a dotted curve, a dashed curve, a distinctly colored curve, a flashing curve, bolded curve, distinctly shaded or colored regions and any combination of the foregoing.

6. The control method of claim 1 wherein the generating of the dynamic capability curve comprises interpolating between respective curves of the family of static capability curves.

7. A system for operating a generator using a dynamic capability curve, the system comprising:
   a date file configured to store a family of static capability curves corresponding to nominal reference levels of pressure of a fluid for cooling the generator;
   a device configured to acquire data indicative of the actual pressure of the cooling fluid; and
   a processor configured to generate a dynamic capability curve responsive to the actual pressure of the cooling fluid, the processor being further configured to access the data file for displaying the family of static capability curves relative to the dynamic capability curve, wherein said processor is configured to generate and display said static capability curves and said dynamic capability curve over a first area indicative of a flower generation mode of the generator and a second area indicative of a power absorption mode of the generator, thereby allowing the operator to monitor and control the operation of the generator regardless of whether said generator is in the power generation mode or in the power absorption mode, based on the actual pressure of the cooling fluid and further in view of at least one of the nominal reference levels of pressure for the cooling fluid.

8. The system of claim 7 wherein the processor is further configured to provide a graphical indication of real and reactive power flow of the generator relative to the family of capability curves arid to the dynamic capability curve.

9. The system of claim 8 further comprising an adjuster for adjusting at least one operational parameter to affect the position of the graphical indication of real and reactive power relative to the dynamic capability curve and at least one of the curves of the family of static capability curves.

10. The system of claim 7 further comprising a module configured to process the dynamic capability curve to be graphically distinctive relative to the displayed family of capability curves.

11. The system of claim 10 wherein the processing of the dynamic capability curve to be graphically distinctive relative to the displayed family of capability curves is selected from the group consisting of generating a dotted curve, a dashed curve, a distinctly colored curve, a flashing curve, bolded curve, distinctly shaded or colored regions and any combination of the foregoing.

12. The system of claim 7 wherein the processor comprises an interpolator configured to interpolate between respective curves of the family of static capability of curves.

13. A method for operating a generator using a dynamic capability curve, the method comprising:

acquiring data indicative of the actual pressure of a fluid for cooling the generator;

generating a dynamic capability curve responsive to the actual pressure of the cooling fluid;

displaying said dynamic capability curve over a first area indicative of a power generation mode of the generator and over a second area indicative of a power absorption mode of the generator, thereby allowing the operator to monitor and control the operation of the generator regardless of whether said generator is in the power generation mode or in the power absorption mode, generating a graphical indication of real and reactive power flow of the generator relative to the dynamic capability curve; and adjusting at least one operational parameter to affect the position of the graphical indication of real and reactive power relative to the dynamic capability curve.

14. The control method of claim 13 further comprising displaying relative to the dynamic capability curve a family of static capability curves corresponding to nominal reference levels of pressure of the cooling fluid.

15. The control method of claim 13 further comprising processing the dynamic capability curve to be graphically distinctive relative to the displayed family of capability curves.

16. The method of claim 15 wherein the processing of the dynamic capability curve to be graphically distinctive relative to the displayed family of capability curves is selected from the group consisting of generating a dotted curve, a dashed curve, a distinctly colored curve, a flashing curve, bolded curve, distinctly shaded or colored regions and any combination of the foregoing.

* * * * *